United States Patent
Van Der Meijs

(10) Patent No.: US 10,906,399 B2
(45) Date of Patent: Feb. 2, 2021

(54) METHOD AND SYSTEM FOR ALERTING A TRUCK DRIVER

(71) Applicant: DAF Trucks N.V., Eindhoven (NL)

(72) Inventor: Floris Van Der Meijs, 's-Hertogenbosch (NL)

(73) Assignee: DAF Trucks N.V., Eindhoven (NL)

( * ) Notice: Subject to any disclaimer, the term of this patent is extended or adjusted under 35 U.S.C. 154(b) by 0 days.

(21) Appl. No.: 16/482,290

(22) PCT Filed: Jan. 31, 2018

(86) PCT No.: PCT/NL2018/050069
§ 371 (c)(1),
(2) Date: Jul. 31, 2019

(87) PCT Pub. No.: WO2018/143803
PCT Pub. Date: Aug. 9, 2018

(65) Prior Publication Data
US 2019/0351823 A1    Nov. 21, 2019

(30) Foreign Application Priority Data

Feb. 1, 2017   (NL) ..................................... 2018281

(51) Int. Cl.
*B60K 35/00* (2006.01)
*G02B 27/01* (2006.01)
(Continued)

(52) U.S. Cl.
CPC .......... *B60K 35/00* (2013.01); *G02B 27/0101* (2013.01); *B60K 2370/176* (2019.05);
(Continued)

(58) Field of Classification Search
CPC .. B60K 35/00; B60K 35/008; B60K 2370/23; B60K 2370/332; B60K 2370/00;
(Continued)

(56) References Cited

U.S. PATENT DOCUMENTS

2009/0231116 A1   9/2009   Takahashi et al.
2015/0232030 A1*  8/2015   Bongwald ................. B60R 1/00
                                                      348/115
(Continued)

FOREIGN PATENT DOCUMENTS

DE         2557038 A1    6/1977
DE    102009053707 A1    5/2011
(Continued)

OTHER PUBLICATIONS

Jan. 21, 2019, International Preliminary Report on Patentability, PCT/NL2018/050069.
(Continued)

*Primary Examiner* — Van T Trieu
(74) *Attorney, Agent, or Firm* — Banner & Witcoff, Ltd.

(57) ABSTRACT

It is aimed to provide a system for alerting a driver of a driver cabin of a motor vehicle, said system comprising: a plurality of light sources arranged in array to project a signal light against the windshield and/or side window, provided in the driver cabin along a horizontal contour of windshield and side windows, outside a line of sight of the driver, and arranged to show a mirror image of the light source in the windshield or side window, visible to the driver; a tracking controller, arranged to identify one or more objects to be tracked in the perimeter of the motor vehicle; a control system, coupled to the tracking controller for activating a number of light sources of the plurality of light sources, arranged to project a signal light indicative of said tracked object substantially centered along a virtual line of sight from the driver towards the identified object.

14 Claims, 14 Drawing Sheets

(51) Int. Cl.
| | |
|---|---|
| *B60Q 9/00* | (2006.01) |
| *B60R 11/04* | (2006.01) |
| *B60R 11/00* | (2006.01) |
| *G06K 9/00* | (2006.01) |
| *G09G 5/38* | (2006.01) |
| *H04N 5/225* | (2006.01) |
| *H04N 5/247* | (2006.01) |

(52) U.S. Cl.
CPC .. *B60K 2370/191* (2019.05); *B60K 2370/194* (2019.05); *B60K 2370/332* (2019.05); *B60K 2370/338* (2019.05); *B60K 2370/66* (2019.05); *B60Q 9/008* (2013.01); *B60R 11/04* (2013.01); *B60R 2011/004* (2013.01); *G02B 27/0179* (2013.01); *G02B 2027/014* (2013.01); *G02B 2027/0138* (2013.01); *G02B 2027/0185* (2013.01); *G02B 2027/0187* (2013.01); *G06K 9/00805* (2013.01); *G09G 5/38* (2013.01); *G09G 2354/00* (2013.01); *H04N 5/2253* (2013.01); *H04N 5/247* (2013.01)

(58) Field of Classification Search
CPC ............ B60K 2370/18; B60K 2370/66; B60K 2370/176; B60K 2370/179; B60K 2370/191; B60K 2370/194; B60K 2370/334; B60K 2370/336; B60K 2370/343; B60K 2370/347; B60Q 9/00; B60R 1/00; B60R 1/02; B60R 1/04; G02B 27/00; G02B 27/01; G02B 27/0101; G02B 27/0149; G02B 27/0172; G02B 27/0179; G02B 27/09; G02B 27/0977; G03B 21/20; G03B 21/2066; G01C 3/08; H04N 5/225; H04N 5/2253; H04N 5/247; H04N 9/31

See application file for complete search history.

(56) References Cited

U.S. PATENT DOCUMENTS

| | | | |
|---|---|---|---|
| 2016/0167515 A1* | 6/2016 | Schmidt ................... | G08G 1/16 701/36 |
| 2016/0200249 A1* | 7/2016 | Boyd ....................... | B60Q 9/00 340/459 |
| 2016/0209647 A1* | 7/2016 | Fursich .............. | G02B 27/0093 |

FOREIGN PATENT DOCUMENTS

| | | |
|---|---|---|
| JP | 2014240228 A | 12/2014 |
| WO | 2012076952 A2 | 6/2012 |

OTHER PUBLICATIONS

Apr. 19, 2018, International Search Report and Written Opinion, PCT/NL2018/050069.

\* cited by examiner

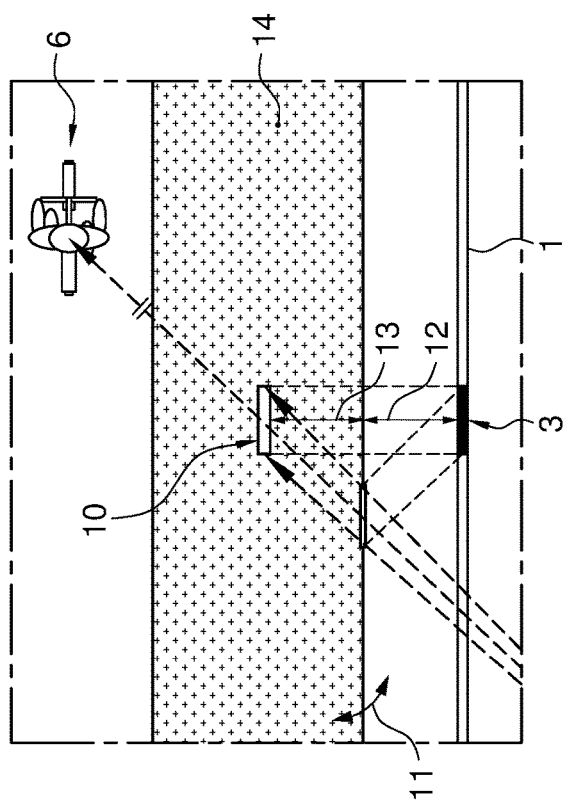
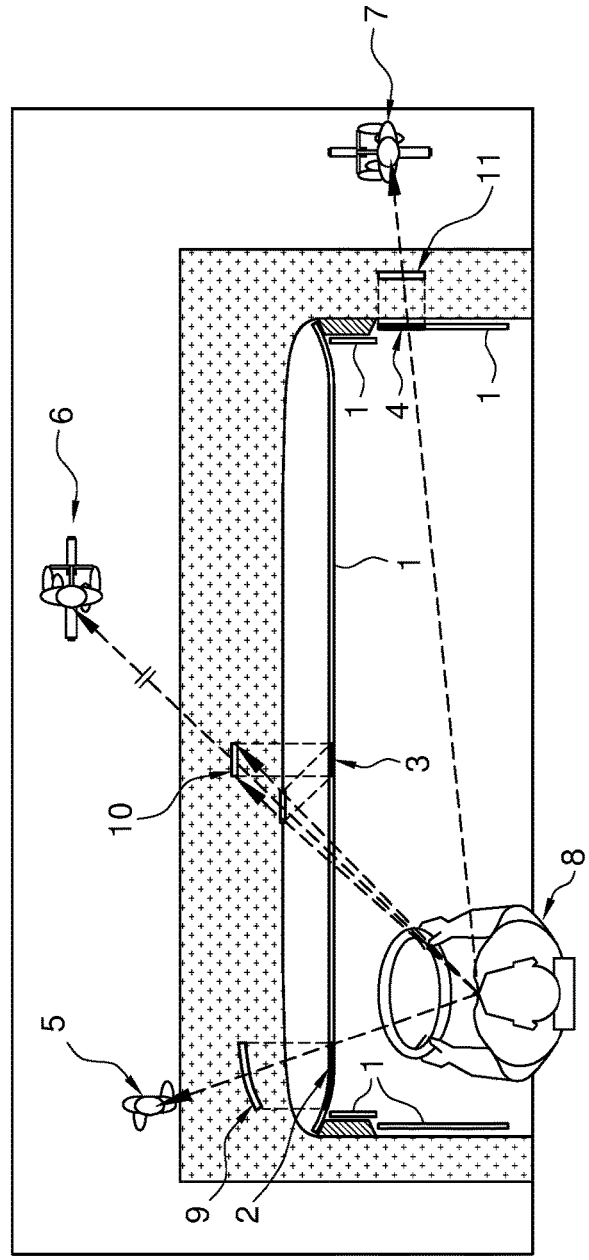
FIG. 4A
FIG. 4B

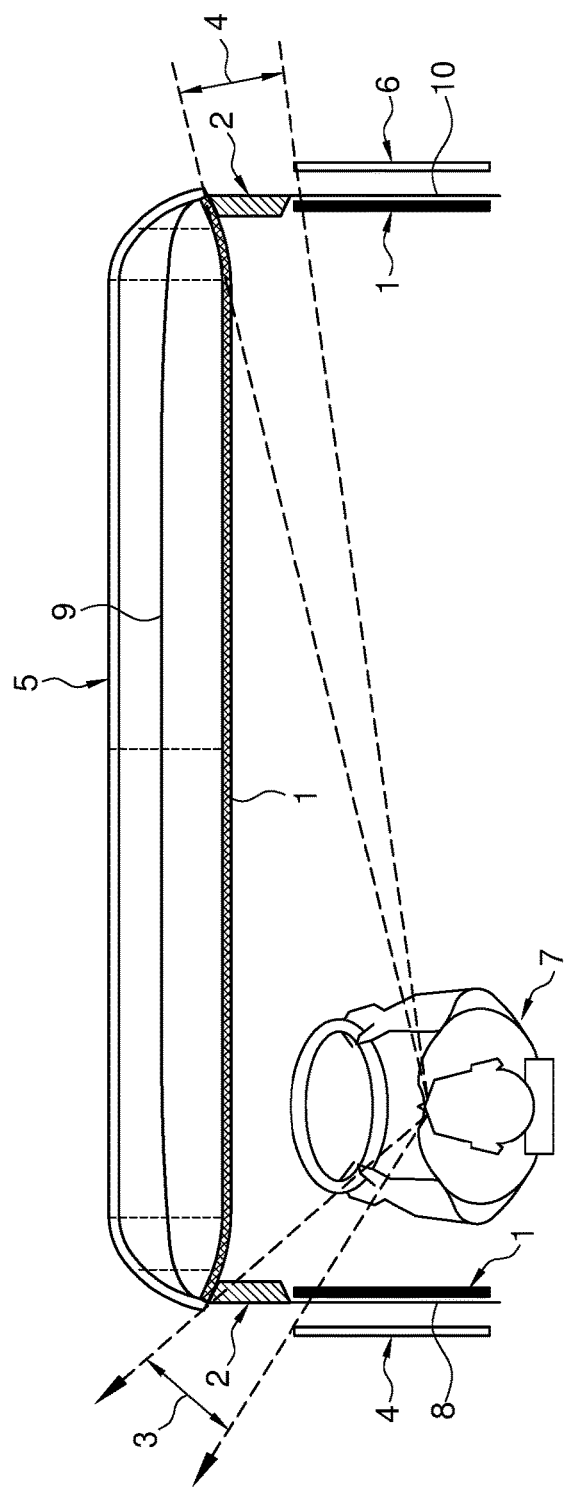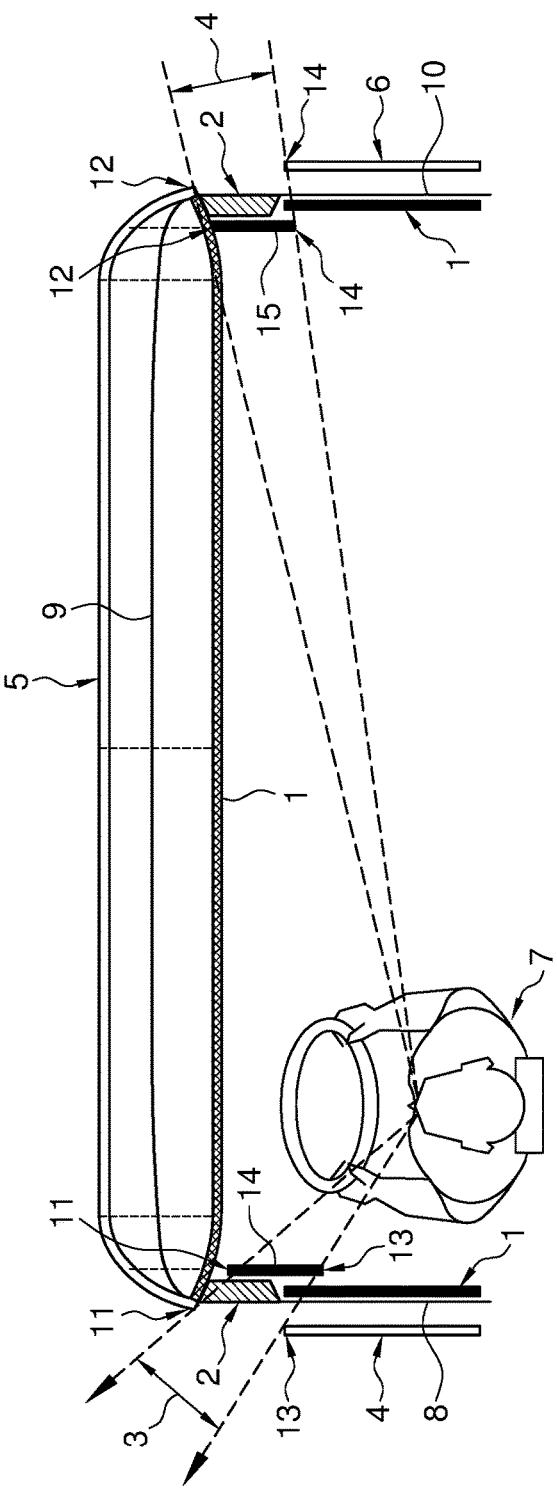
FIG. 8A
FIG. 8B

METHOD AND SYSTEM FOR ALERTING A TRUCK DRIVER

CROSS-REFERENCE TO RELATED APPLICATIONS

This application is a U.S. National Stage application under 35 U.S.C. § 371 of International Application PCT/NL2018/050069 (published as WO 2018/143803 A1), filed Jan. 31, 2018, which claims the benefit of priority to Application NL 2018281, filed Feb. 1, 2017. Benefit of the filing date of each of these prior applications is hereby claimed. Each of these prior applications is hereby incorporated by reference in its entirety.

FIELD OF INVENTION

The invention relates to a method and system for alerting a truck driver.

DESCRIPTION OF THE PRIOR ART

In present days, more and more Advanced Driver Assistance Systems (ADAS systems) are introduced in motor vehicles. These so-called ADAS systems comprise scanning sensors, scanning the environment of the vehicle, and a computer control system for making decisions on intervening in and/or supporting the driver actions. The system further comprises actuators like braking and steering and preferably a communication means for informing the driver on the status of the system and/or providing warning signals in case of hazardous traffic condition also referred to as Human Machine Interface (HMI). These ADAS systems focus on road safety and warn the driver in case of a dangerous situation involving other road users or other risk of damage to vehicle and/or environment. The way drivers are alerted is also subject to improvements. A conventional way of providing ADAS warnings is displaying alert signals on the instrument cluster of the vehicle. However, this has as negative side effect that the instrument panel requires constant attention that is drawn to the inside of the vehicle, away from the actual danger outside of the vehicle.

A new trend for collision warning is to project instrument panel data on the windscreen of the vehicle. This keeps focus to the outside of the vehicle. Also it is known to project a braking signal light on the windscreen, in case of a collision warning. In U.S. Pat. No. 8,049,609 a system is disclosed that projects an array of light sources provided on a surface of an instrument panel of a vehicle opposed to a windshield, displaying target information. One problem specifically related to truck drivers, is that many objects along the direct vicinity of the truck are not visible to the driver.

There is high need to further develop and optimize these systems. One of the many challenges is the feedback of the ADAS system to alert the driver, while not distracting him or her with signals that would keep the focus of the real situations of interest.

There is a need to provide a reliable method for alerting a driver, based on these ADAS signals, in a practical set up. This invention envisages a solution in this respect.

SUMMARY OF THE INVENTION

It is aimed to provide a method and system for alerting a driver of a driver cabin of a motor vehicle. The system comprises a plurality of light sources arranged in one or more arrays to project a signal light against the windshield and/or side window. The light sources are provided in the driver cabin along a horizontal contour of windshield and side windows, outside a line of sight of the driver. A so-called light array may be preferably constructed of a strip of LEDs that are independently activatable, referred to as "ADAS LED bar" herebelow. The light sources are arranged to show a mirror image of the light source in the windshield or side window, visible to the driver. A tracking controller is arranged to identify one or more objects to be tracked in the perimeter of the motor vehicle. A control system is coupled to the tracking controller for activating a number of light sources of the plurality of light sources, arranged to project a signal light indicative of said tracked object substantially centered along a virtual line of sight from the driver towards the identified object.

For a truck driver this has the advantage that in the perception of the driver a direct view and virtual view in a vehicle's blind spot outside the line of sight, can be merged by projecting the signal lights for visible and blind spot objects on the windscreen over a visibility range, seen from the drivers perspective of about 180 degrees along a perimeter of the windscreen and side window. Thus, not only an alert is given for visible objects, but especially for objects that are not visible. In this respect a virtual line of sight from the driver towards the identified object provides a direction in which a tracked object is located relative to the driver, and light sources centered along this line of sight are activated signalling the tracked object. The driver can be warned for threatening or immediate dangers. Different signalling can be provided for visible and invisible (blind spot) objects that can be made via colours, sizes and/or highlighting a part of the light array(s).

BRIEF DESCRIPTION OF THE DRAWINGS

The invention will be further elucidated in the figures:

FIGS. 4A and 4B show in more detail a visualisation of an object projected by the signalling lights.

FIGS. 8A and 8B show a cross sectional view of an optical arrangement of a signal system, where FIG. 8B refers to a design improvement of the ADAS Led bar near the A-pillar FIGS. 9A, B and C show realizations of the system referring to sides of the vehicle;

DETAILED DESCRIPTION

Figure 1A:
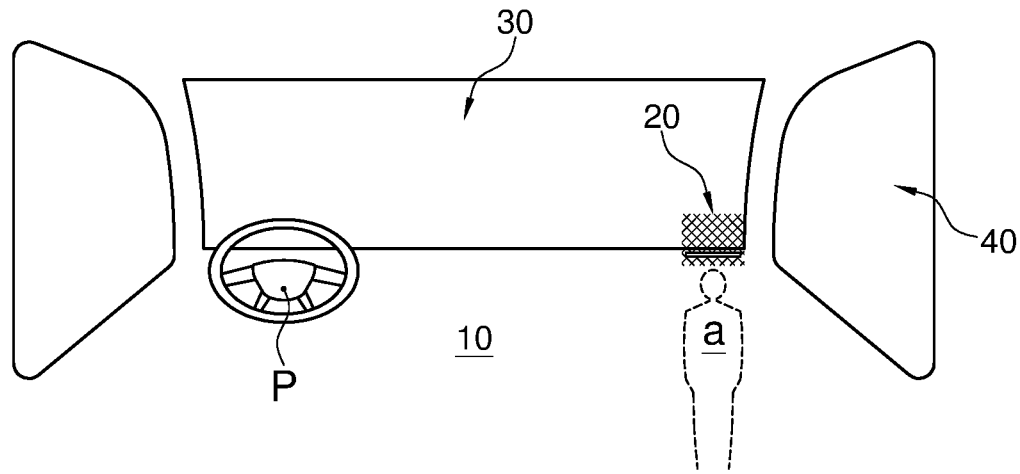
FIGS. 1A and 1B show a first schematic illustration of an embodiment of the invention.

Unless otherwise defined, all terms (including technical and scientific terms) used herein have the same meaning as commonly understood by one of ordinary skill in the art to which this disclosure belongs as read in the context of the description and drawings. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some instances, detailed descriptions of well-known devices and methods may be omitted so as not to obscure the description of the present systems and methods. Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be further understood that the terms "comprises" and/or "comprising" specify the presence of stated features but do not preclude the presence or addition of one or more other features. All publications, patent applications, patents, and other references mentioned herein are incorporated by reference in their entirety. In case of conflict, the present specification, including definitions, will control.

The term "controller" is used in a conventional way to signify any structural hardware or software arrangement having a capability of executing program logic in order to provide a certain basic function. A skilled person is typically aware of how to operate or implement a circuit in the context of the description, with processor elements elucidated here below. For example, a 'signal controller' comprises hard/and or software elements dedicated to the purpose, as further illustrated here below, of activating a number of light sources to project a signal light indicative of a tracked object substantially centered along a virtual line of sight from the driver towards a tracked object.

Moreover a central vehicle management system may be provided with program logic to control the engine transmission and brake of the truck, in order to accelerate or decelerate the truck, to regulate the vehicles behavior in dependence of an initial response of the driver to the signal light or even evoked by the ADA system itself in case a collision is imminent. In the latter case interventions in the steering of the vehicle may be considered to generate or stimulate an evasive manoeuver. The tracking controller program logic may comprise feedback control circuitry, that is based on sensor inputs that measure an inter distance and relative velocity between the truck and an object that is detected, from an ultrasonic sensor, a radar, lidar, camera image or combinations thereof.

The term "program logic" is used in a conventional way to signify the operating instructions, which may be embodied in hard- or software structures, that control a circuit to the designated functional behavior.

The term "signal line" is used in a conventional way to signify an information exchanged via signal transmission, which may be in the form of coded signals, in analogue or digital fashion by any conventional communication device, where it is not excluded that other signal lines are available, but merely to signify that a certain connectivity is available. This may also indicate indirect connectivity, that is, a signal line may be provided by indirect signalling, for example wireless signalling and/or via another functional device.

The processor may be a dedicated processor for performing in accordance with the present system or may be a general-purpose processor wherein only one of many functions operate for performing in accordance with the present system. The processor may operate utilizing a program portion, multiple program segments, or may be a hardware device utilizing a dedicated or multi-purpose integrated circuit. Any type of processor may be used such as a dedicated or shared one. The processor may include microcontrollers, central processing units (CPUs), graphical processing units (GPUs), digital signal processors (DSPs), ASICs, or any other processor(s) or controller(s) such as digital optical devices, or analog electrical circuits that perform the same functions, and employ electronic techniques and architecture. The controller or processor may further comprise a memory that may be part of or operationally coupled to the controller. The memory may be any suitable type of memory where data is stored. Any medium known or developed that can store and/or transmit information suitable for use with the present systems and methods may be used as a memory. The memory may also store user preferences and/or application data accessible by the controller for configuring it to perform operational acts in accordance with the present systems and methods.

While example embodiments are shown for systems and methods, also alternative ways may be envisaged by those skilled in the art having the benefit of the present disclosure for achieving a similar function and result. E.g. some components may be combined or split up into one or more alternative components. Finally, these embodiments are intended to be merely illustrative of the present system and should not be construed as limiting the appended claims to any particular embodiment or group of embodiments. Thus, while the present system has been described in particular detail with reference to specific exemplary embodiments thereof, it should also be appreciated that numerous modifications and alternative embodiments may be devised by those having ordinary skill in the art without departing from the scope of the present systems and methods as set forth in the claims that follow. The specification and drawings are accordingly to be regarded in an illustrative manner and are not intended to limit the scope of the appended claims.

Figure 1B:
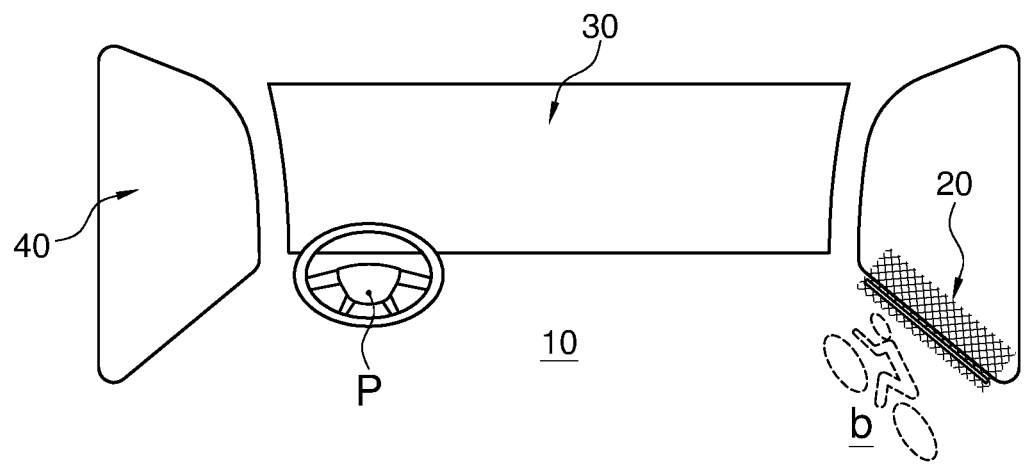

FIG. 1 shows a generic setup of a signal system. The system schematically illustrates a driver cabin 10 of a motor vehicle. From a drivers perspective P light sources are not directly visible, but arranged in array to project a signal light 20 against the windshield 30 and/or side window 40. The light sources, as will be further illustrated in the following figures are provided in the driver cabin along a substantially horizontal lower contour of windshield 30 and side windows 40, outside a line of sight of the driver. As is illustrated by the signal light 20, a mirror image of the light source is shown in the windshield 30. In FIG. 1A it is illustrated, by way of example that a pedestrian a is in the blind spot area in front of the truck. In FIG. 1B it is illustrated that a cyclist b is detected in the blind spot area besides the truck. Pedestrian a or cyclist b are tracked by a tracking controller, further disclosed herebelow, arranged to identify objects to be tracked in the perimeter of the truck, in particular, the truck cabin 10. A signal controller is coupled to the tracking controller and activates the light sources to project a signal light 20 indicative of said tracked object (a, b). Advantageously, the signal light 20 is substantially centered along a virtual line of sight from the driver towards the identified object to direct the drivers attention to the real objects, instead of a warning panel.

Figure 2:
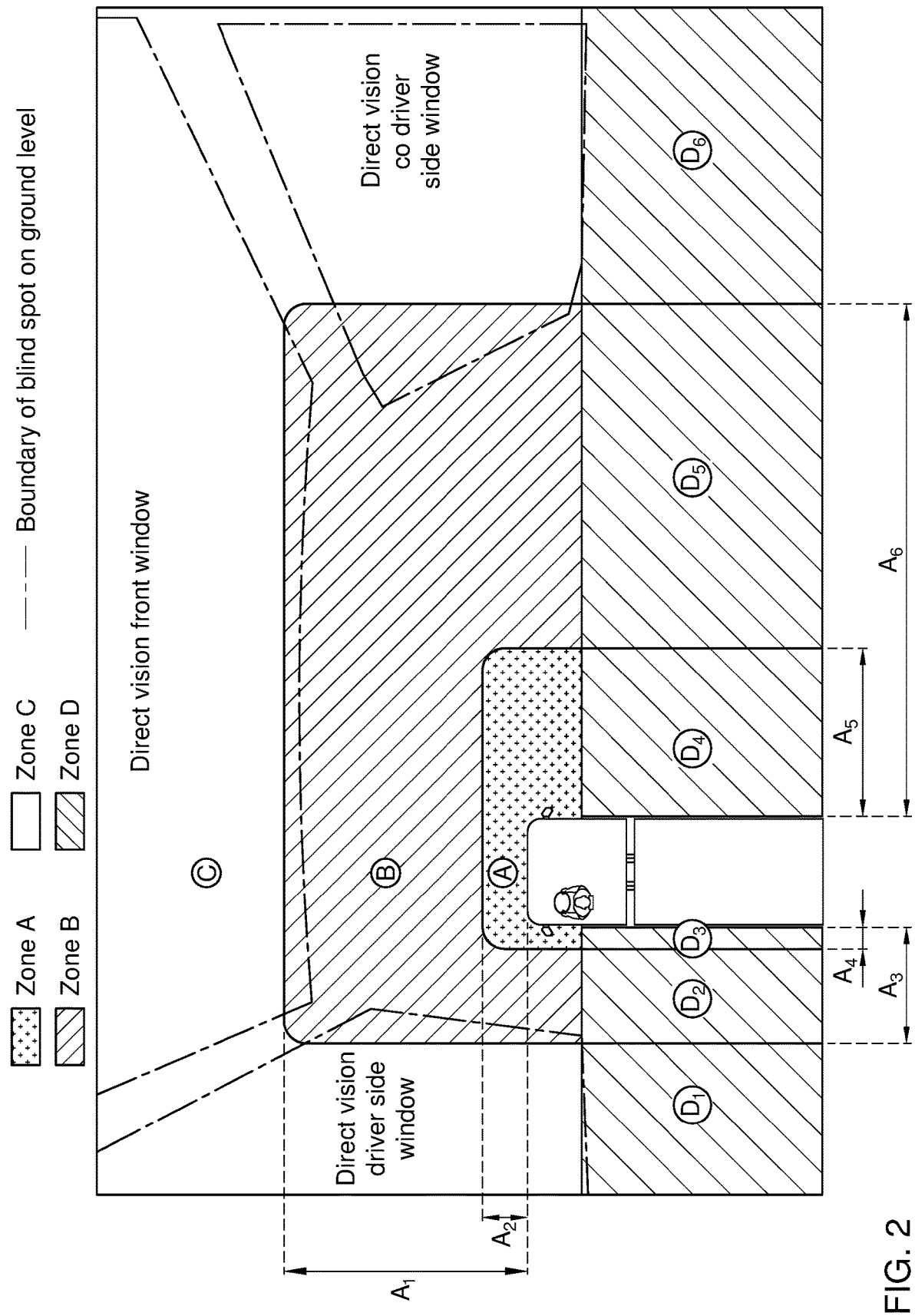
FIG. 2 shows a schematic visibility map of objects visible to a truck driver.

FIG. 2 further provides an indicative schematic visibility map of objects visible to a truck driver. In the map, different zones are defined that define different signalling characteristics of the signalling controller. For example the signal controller is responsive to further information of the tracking controller, e.g. distance and relative speed of the tracked object. In dependence of the distance, e.g. in zones defining a proximity distance, an intermediate distance and a further distance, object representation differs. Advantageously, the signal controller is programmed to signal according to tracked objects detected in different zones based on actual blind spots caused by cab geometry. E.g. in a area (Zone A) very close to the vehicle (e.g. first 1 or 2 m) objects of substantial height (e.g. persons, bicycles even as high as 1.5 m) are not visible. In the area far away (Zone D) from the vehicle at the edge of the blind spot (e.g. >12 m away from the vehicle) also objects of limited height are directly visible. Obviously, the distances may vary, e.g. depending on the geometry and size of the truck, and the height of the driver position.

Second zone B covers is the largest part of the blind spot area, that is an area wherein objects of limited height are not visible. Objects detected in zone B may be represented differently than in objects in zone A, i.e. the signal controller of the signal lights is based on an actual distance between a driver's eye point and an object center point, so that the driver gains insight in the distance(s) between himself and the object(s): e.g. signal lights in the form of a large active LED area implies that an object is close by; and a small active LED area implies object is further away. See also FIG. 3. In zone C tracked objects which are in this area are outside the blind spot (thus visible). Again, by way of example, in this zone there can be no visual representation of a detected distance between an object and the driver, in contrast to signalling in zone B. In this zone no visual representation is thus given for the distance of the object relative to the driver and the signalling controller does not aid the driver in estimating the distance between to the object. Also, since zone C is furthest away from the driver this visual representation in this area is smaller compared to the other zones. In this area, advantageously, a noticeable minimal value of light sources is signalled applicable for objects in this area matching a detection criteria. See also FIG. 3 for further examples.

Objects in zone D are in the rear area extending behind the eyes of the driver, and may be displayed at the outer ends of the array of light sources, seen from the drivers perspective in a side view of about 90 degrees along a perimeter of the side window. Since objects that are detected in this area are not projected by signal lights centered along a virtual line of sight from the driver towards the identified object yet another signalling representation is provided for these objects, e.g. in a smaller active area on an outer end of the array of light sources. Also, there is provided a transition for signalling objects that move between the different zones. In order to provide a meaningful transition and provide a different visual representation helping the driver estimating the distance between him or herself and the object, zone D may be split up in various sub regions, e.g. up to six different sub zones in order to get a fluent transition in case objects move from zone A, B or C to zone D. Accordingly, zone A covers a blind spot area close around the cab and can be extended with a rear area D1.

For a truck zone A, i.e. the blind spot zone for objects even larger than 1.5 in, can have zone dimensions as follows: A2: extending in the front of the truck, ranging up to 2 in; A4: the blind spot zone sideways on the drivers side, ranging up to 0.5 in; A5; the blind spot zone sideways opposite the drivers side, ranging up to 4 in.

For a truck zone B, i.e. the blind spot zone for objects smaller than 1.5 in dimensions may be as follows: A1: the blind spot area extending in the front of the truck ranging up to 7 in; A3: the blind spot area extending sideways on the driver side: ranging up to 3 in and A6: the blind spot area extending sideways opposite the driver side: ranging up to 14 m.

Figure 3:
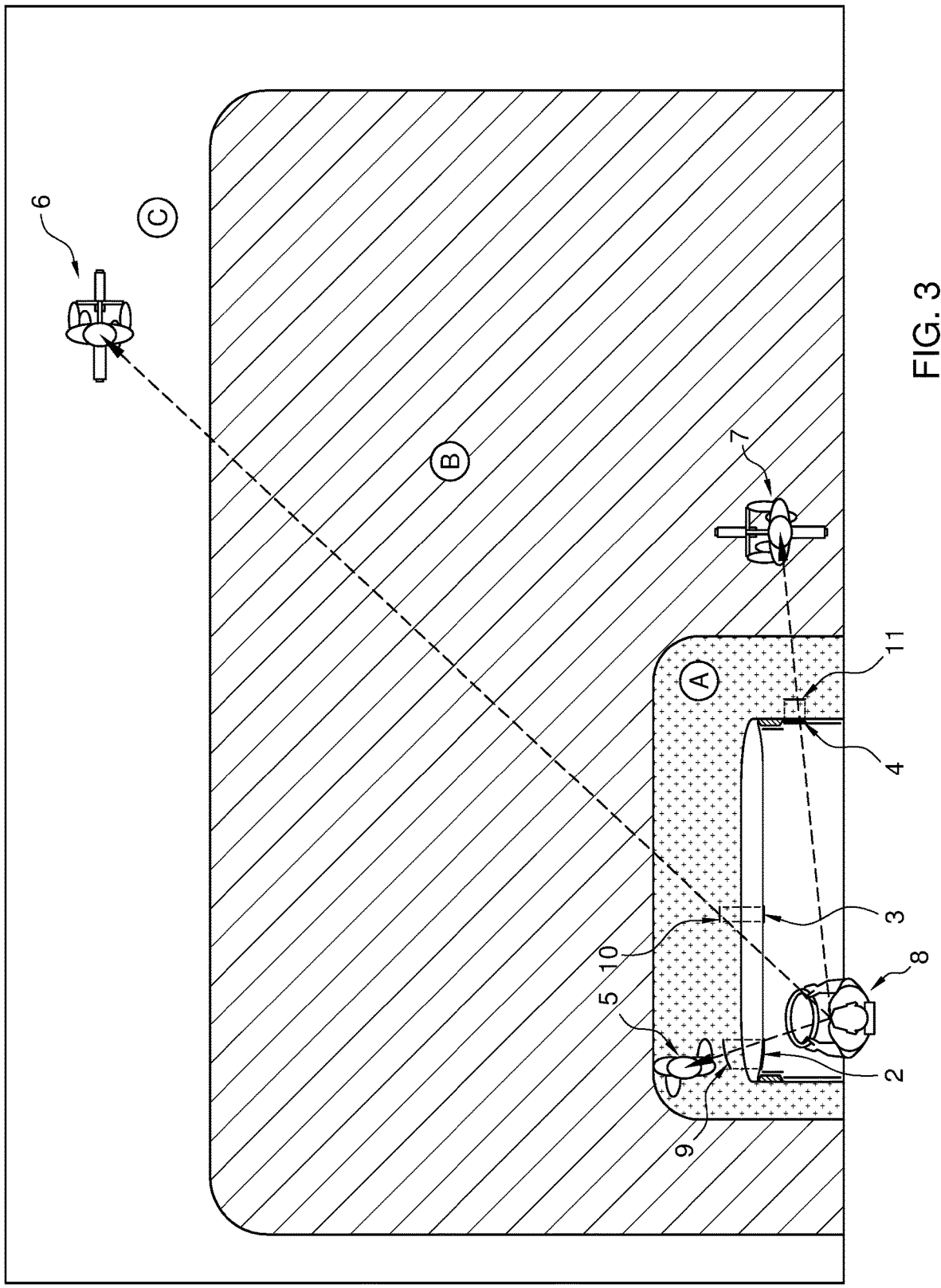
FIG. 3 shows a schematic indication of projecting a signal light indicative of a tracked object along a virtual line of sight.

FIG. 3 shows an indicative representation for projecting a signal light (9, 10, 11) indicative of a tracked object (5, 6, 7) substantially centered along a virtual line of sight from the driver 8 towards the identified object (5, 6, 7). For this purpose, advantageously a driver detection device registers the location of the drivers head or eyes relative to the signal light. It is noted that a projected light source will differ from the physical light sources (2, 3, 4), which may therefore not be on the line of sight; which depends of orientation of the line of sight relative to the window screen. The signal controller can thus be arranged to include a driver detection device, and the signal controller is programmed to adjust the virtual line of sight depending on a detected drivers position from the driver detection device. The reflection of the active signal light area 9, 10, 11 is not too small in order for the reflection to remain sufficiently noticeable and understandable for the driver, e.g. a length of 5-10 cm may be considered minimal. In an advantageous embodiment, a maximal size of the reflection of signal lights related to objects in zone A, B, or C is perceived as fitting the actual object type size as if that of that object is located on the border of zone A and zone B. This provides a realistic visualisation of the object by the signal controller. In another advantageous embodiment, the signal system is programmed to activate said signal light indicative of said tracked object being visible to the driver. Thus, objects detected in zone A close to the perimeter of the truck may be signalled differently, e.g. by a flashing light signal, from objects detected in zone B.

FIG. 4a shows in more detail the visualisation of an object 6 projected as 10 by signalling area 3 of the signalling lights 1. The parts 2, 3 and 4 as shown in FIG. 4B of the ADAS LED Bar 1 that are activated to indicate the presence of the objects projected as 9, 10 and 11 respectively, depends on the position of these objects 5, 6 and 7 in relation to the driver's eye point 8. As seen in FIG. 4b the center of the virtual images 9, 10 and 11 of the active LED Bar area as reflected in the window are lined up with the center of the objects 5, 6, and 7 as seen from a drivers perspective (8). To determine which part of the ADAS LED Bar 1 is to be activated is based on the following aspects as shown in FIG. 4A: Position of drivers eye points and position of object: this results in viewing angle 11 of driver on the window 14.

Based on this viewing angle 11, the "angle in =angle out" principle for reflections and the distance 12 between the window 14 and the ADAS LED Bar 1 the correct area of the ADAS LED Bar which is activated (3) is determined.

This all results in a virtual image 10 directly on the line of sight from the driver 8 to the related object 6.

This virtual image is reflected in the windscreen 14 with a projection distance 13 in this example equal to the distance 12 of the activated part of the ADAS Led bar to the windscreen.

Figure 5A:
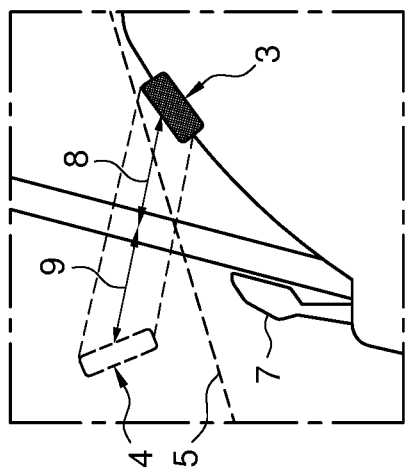
FIG. 5 shows a schematic side view of driver cabin provided with an illustrative signal system.
Figure 5:
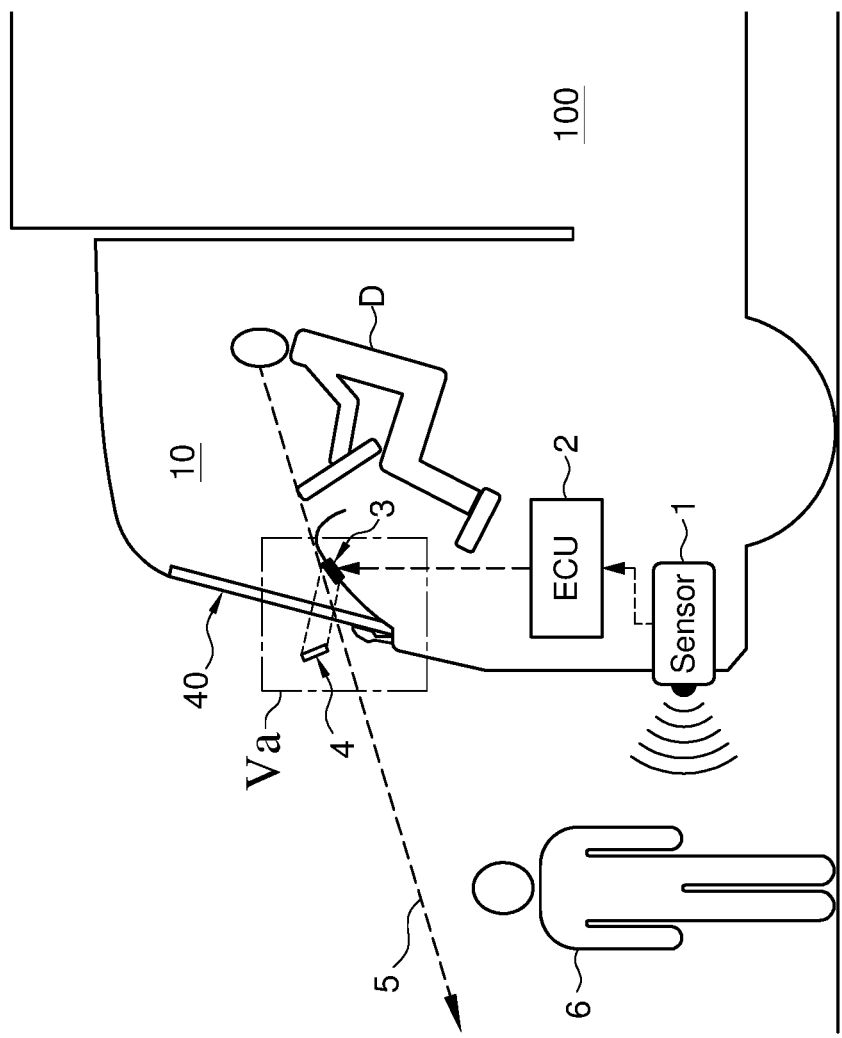
Figure 11A:
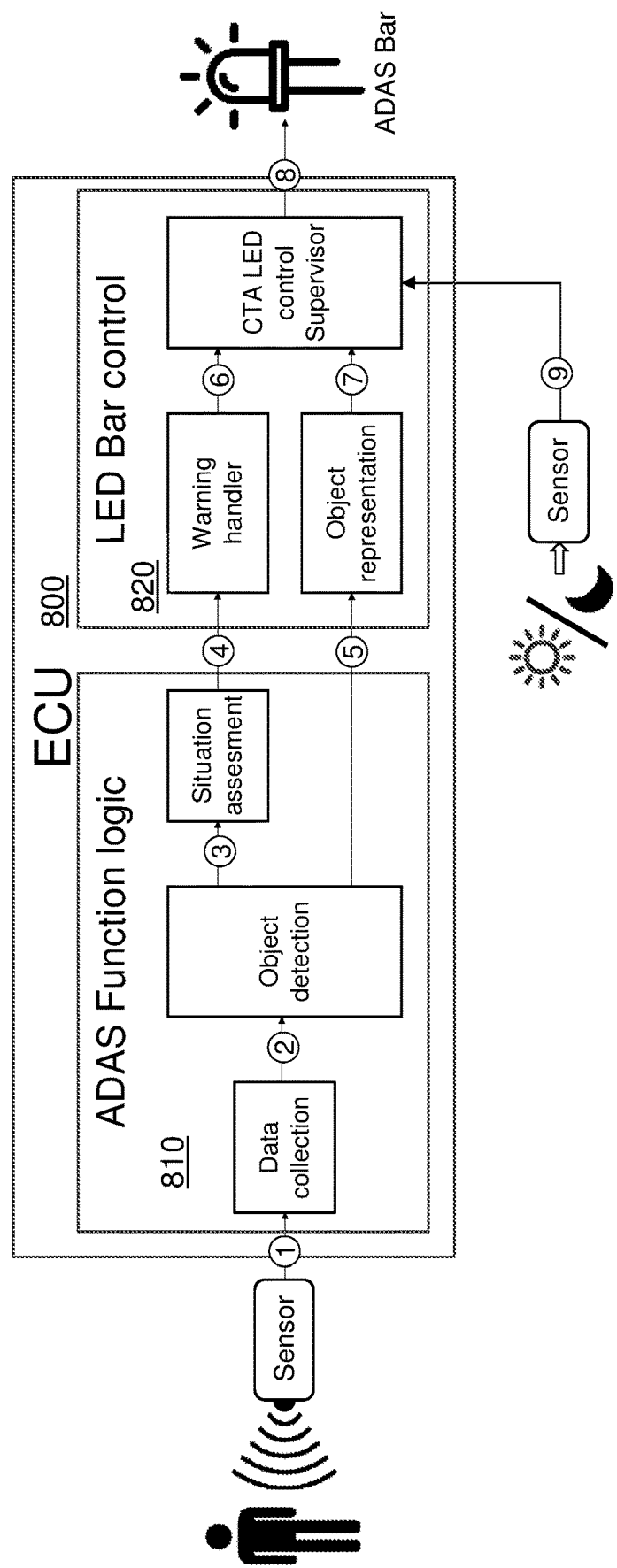
FIGS. 11A and B show an exemplary setup of a tracking and signal controller.
Figure 11B:
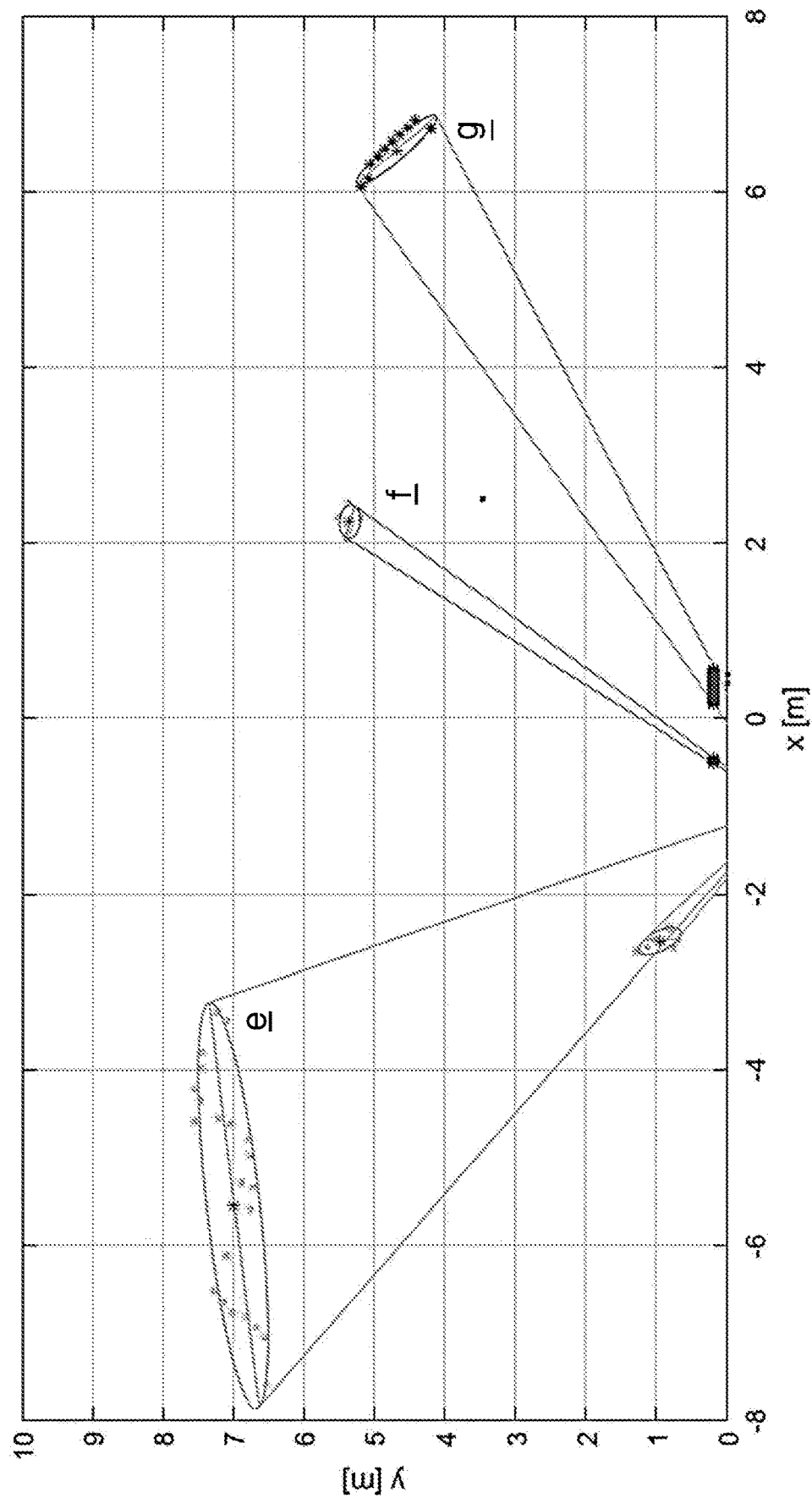

FIG. 5 schematically shows a sensor setup for a signal system described here above. A sensor 1, that can be specifically designed for a designated zone, e.g. the front area A1, A2 of the truck (see FIG. 2), scans the environment for objects, for example a pedestrian (6). In the cabin 10, a central control unit may be provided, e.g. the engine control unit ECU, or any suitable information management system 2 provided in the truck, that continuously tracks objects, detected from sensor 1, as they move relative to the vehicle 100 and driver D. To this effect, the ECU 2 has a tracking controller that translates raw data from sensor and determines relevant objects. With reference to FIGS. 11A and 11B in more detail examples are illustrated of such a tracking operation, which may be carried out in ways known to the skilled person. Based on the tracking operation a signaling controller provided in ECU 2 controls part of a signal light array that may be provided as on an elongated support as a or signal bar or ADAS bar 3. Signal bar 3 comprises a plurality of light sources arranged in array provided in the driver cabin 10 along a horizontal contour of windshield and side windows. The light source can emit several colors of lights to warn the driver or attract his attention. The signalling is related to the relevant object, as seen from a driver's perspective 4 above a lower edge 5 of a driver's view outside the window. The bar 3 is not directly visible to the driver since it is arranged outside a line of sight 5 above the windscreen, that defines the visual perimeter. The active signaling area of the bar 3 reflects in the window 4, illustrated in the insert FIG. 5*a*. It is shown that a mirror image 4 of the active ADAS bar area provided by a reflection 4 projected on the window 40. To this end ADAS bar light sources are at a certain distance away from the windscreen: 10-40 cm 8. This optical distance may be enlarged by intermediate mirrors as will be illustrated in the subsequent figures. Preferably, the reflection 40 is on a free area of the windscreen 40 above the windscreen wipers 7, resulting in a projections in front of the vehicle 9, drawing attention to the outside, where the relevant object 6 is detected.

Figure 6A:
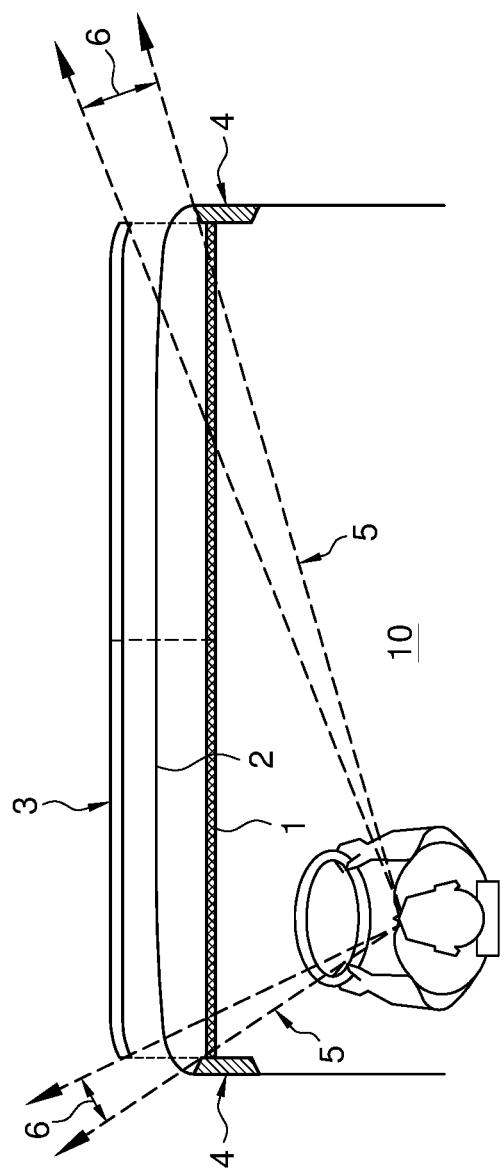
FIGS. 6A and 6B show an embodiment of a light source array provided along the windshield.
Figure 6B:
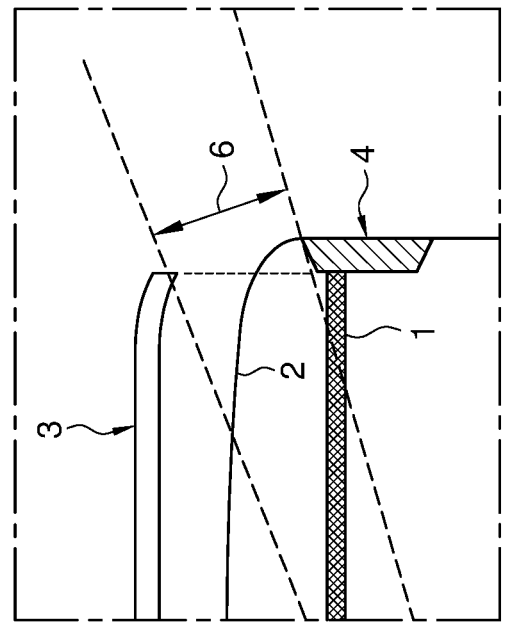

FIGS. 6A & 6B show top views of the driver cabin 10, e.g. of the type depicted in FIG. 5. The ADAS LED Bar 1 is preferably placed at a certain distance away from the front windscreen 2 in order to achieve a sufficient projection distance of the virtual image 3 as perceived by the driver. The truck cab and windscreen design implies that in order to achieve this distance the LED bar is to be placed between the upstanding A-pillars 4 delineating windscreen 2. This results in a virtual image, as seen by driver 5, which does not cover the corner of the windscreen where it reaches the A-pillars 6.

Figure 7A:
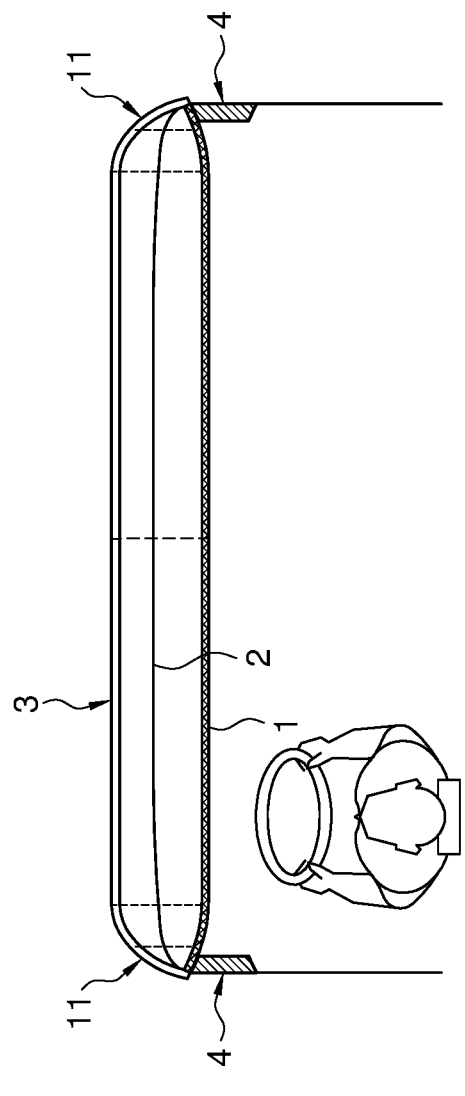
FIGS. 7A and B show a further schematic view of driver cabin provided with another illustrative signal system.
Figure 7B:
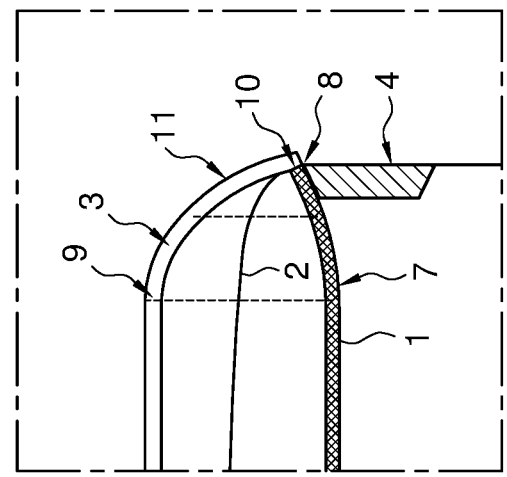

By giving the ADAS LED Bar 1 a curvature as shown in FIGS. 7A & 7B which starts at 7 and ends at 8 the reflection in the front windscreen 2 will result in a virtual image 3 which will have a curve starting at 9 and ending at 8. Due to the curvature 10 of the front windscreen 2 near the A-pillars 4 the curve of the reflected virtual image 3 will have a change in radius and end up right at the A-pillar.

Accordingly, the array of light sources 1 is provided on an elongated support that is curved towards the windshield 11 or side window 10. This curvature 11 is especially adjusted on the opposed end sides of the front wind screen 2. Also in this curvature 11 of the support, the array of light sources 1 may be adjusted to the curvature of the windshield 2 e.g. so that a mirror image of the light source is projected at a substantially constant distance in the viewing direction as seen from the driver.

To further adjust for the visual effect, relative to the driver the signal controller may be provided with a driver detection device. The signal controller may thus be programmed to adjust the virtual line of sight depending on a real detected drivers position from the driver detection device. Such a detection device may be based on eye tracking mechanisms, etc.

The signaling array formed by LED Bar 1, as shown in FIG. 8A is interrupted at 11 and 12 near the A-pillars 2. This implies that objects in the areas 3 and 4 directly behind the A-pillar are not (fully) represented by reflections 5, 6 and 7 on any of the windows 8, 9 and 10. To remedy this, the ADAS LED Bar 1 design as shown in FIG. 8B is continued behind the A-pillars 2 in such a way that from a drivers point of view 7 it starts at end of the reflection in the front windscreen 11 and 12 and ends where the reflection in the side window(s) starts 13 and 14 the object hidden behind the A-pillars 3 and 4 can be fully covered by the ADAS LED Bar. In particular, a tracked object is thus projected on side posts of the cabin substantially centered along a virtual line of sight from the driver towards the identified object The in between parts 14 and 15 of the ADAS LED Bar in the viewing direction of the A-pillars can either be directly visible or indirectly visible through reflection on the side posts or A-pillars 2. A system according to claim 12, wherein the side posts are covered with a reflective material, so that a mirror image of the light source is projected at a virtual distance behind the side post. For example, to achieve this, the side posts may be covered with a (highly) reflective material, so that a mirror image of the light source is projected at a virtual distance behind the side post.

Figure 9A:
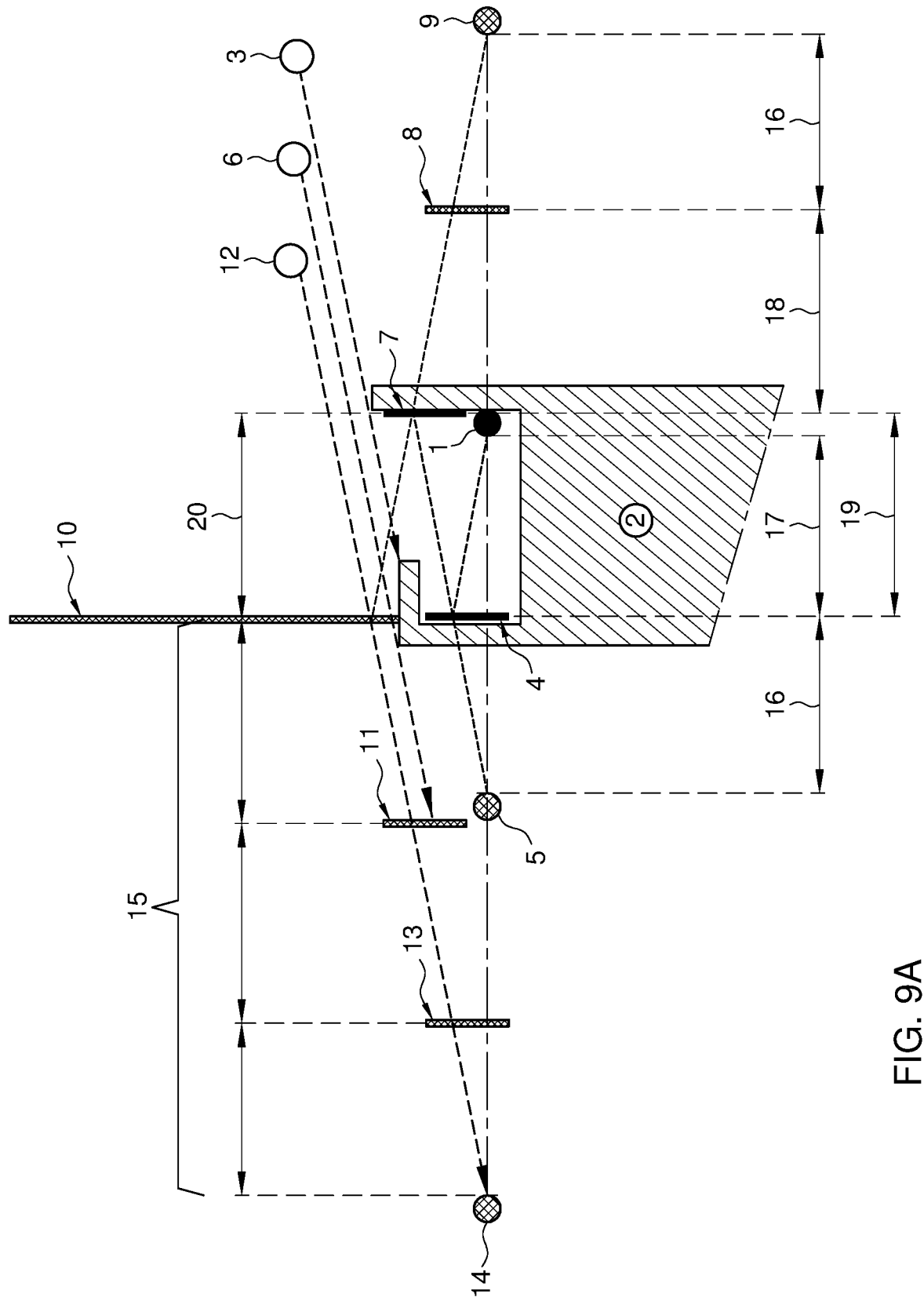
Figure 9C:
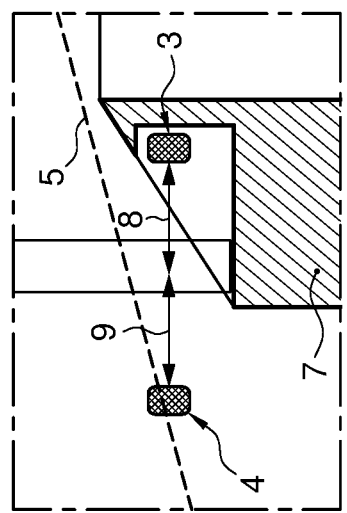
Figure 9B:
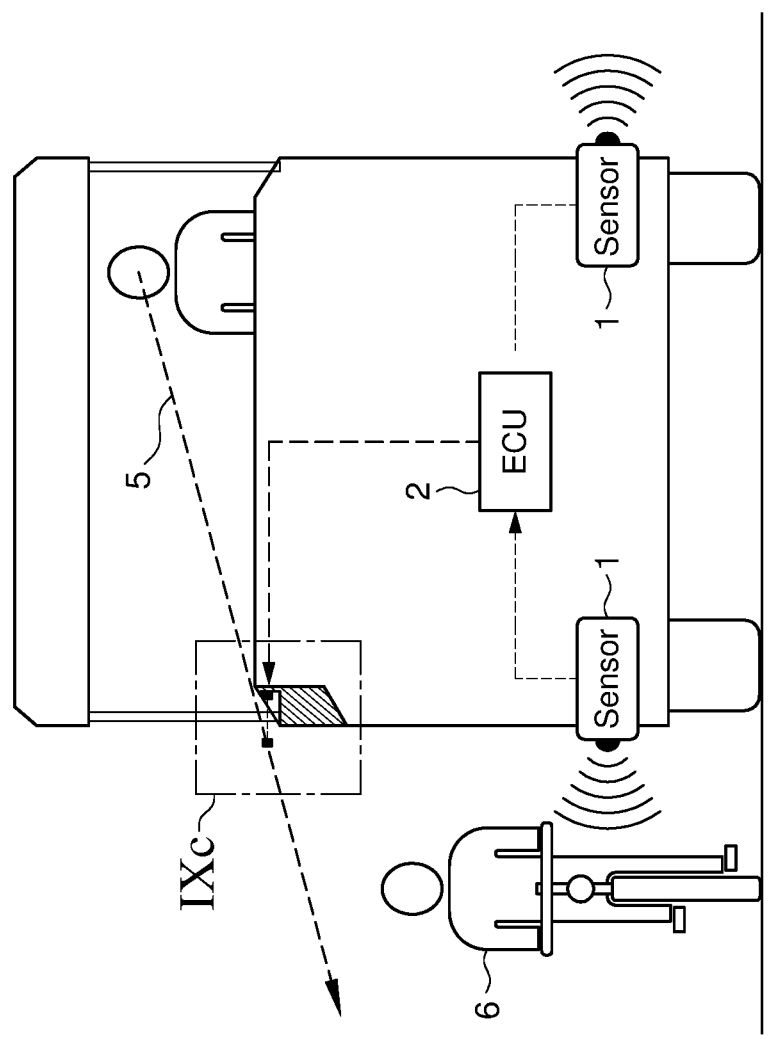

FIGS. 9*a*, *b* and *c* schematically display an ADAS LED bar system that comprises a light source (an array of light sources), integrated in the side doors, that may emit differing colors of lights to warn the driver or attract attention. To this end sensor 1 (FIG. 9*b*) scans environment for objects, for example a pedestrian 6 and continuously tracks objects as they move relative to the vehicle and driver. Raw data from sensor 1 (FIG. 9*b*) are received by ECU 2 that translates the data to determines relevant objects, for example the pedestrian 6 and activates a part of ADAS bar 3 (FIG. 9*a*) that is related to the relevant object.

The ADAS bar can not be directly seen by the driver 5, but the active area of ADAS bar reflects in the window 4 The ADAS bar light source is a certain distance away from the window: 5-20 cm, resulting in a projection outside the vehicle, drawing attention to the outside, where the relevant object is 6. For the side windows in the cabin, the ADAS LED Bar 1 may be located in the door 7 in such a way that it can not be seen from the drivers seat. Thereby the virtual image 4 is projected in the side window 5 on a location which is visible from the drivers seat. The ADAS LED Bar can be located in a side door so that it can not be seen from the drivers seat—see FIG. 9*c*.

The ADAS LED Bar 1 should be a certain distance 8 away from the side window 5 in order to achieve a sufficient projection distance 9 of the virtual image 4 as perceived by the driver 6. However, see FIG. 9*c*, the distance between window and ADAS LED Bar is limited by the width of the door 7, e.g. this distance may be 4 cm at the narrowest point of the door. Such a projection distance 9 may be insufficient at the narrowest point of the door to draw the attention towards the outside, there where the object is. To further improve the signalling system, support 2 is adjusted (see FIG. 9*a*), so that in an optical path between a light source 1 and window 10, one or more mirrors 4, 7 are provided, said mirrors 4, 7 increasing an optical path distance from the light source 1 to window 10. For example, it can be shown that the light source 1 corresponds with virtual image positions 9 and 14, in particular, the light source is imaged at a certain optical distance 15 away from windshield 10. The ADAS LED Bar (1) is reflected in a mirror 4. This mirror is also located in the door in such a way that it can not be seen directly from the drivers seat 5. The "first" virtual image 6 is reflected in the mirror 4. This virtual image 6 can not be seen from the drivers seat. The ADAS LED Bar 1 is reflected in the first mirror 4, also located in the door in such a way that it can not be seen directly from the drivers seat 3. This implies the "first" virtual image 5 is reflected in the first mirror 4. Both the first mirror 4 and first virtual image 5 can not be seen from the drivers seat 6. First mirror 4 and first virtual image 5 are reflected 8 & 9 in a second mirror 7. This second mirror is located in the door 2 in such a way that it can not be seen from the drivers seat 3.

Because the driver can not see the second mirror 7 the virtual images 8 & 9 realized by the second mirror 7 are not visible from the driver seat. The second mirror 7 and its internal virtual images 8 & 9 of the first mirror 4 and first virtual image 5 are projected in the side window 10. This results in a virtual image 11 of the second mirror 7 which is visible from the driver seat 12. In the virtual image 11 of the second mirror 7 the internal virtual images 8 and 9 are also projected in the side window 10 resulting in a second virtual image 13 of the first mirror 4 and a third virtual image 14 of the ADAS LED Bar 1. The third virtual image 14 of the ADAS LED Bar 1 is visible from the drivers seat 12.

Projection distance 16 of the first virtual image 5 in the first mirror 4 which is equal to the distance 17 between the ADAS LED Bar 1 and the first mirror 4. Projection distance 18 of the virtual image 8 of the first mirror 4 is equal to the distance 19 between the first 4 and second 7 mirror. Projection distance of the second virtual image 9 of the ADAS LED Bar 1 is the sum of the projection distance 16 of the first virtual image 5 plus the projection distance 18 of the virtual image 8 of the first mirror 4 in the second mirror 7. Similar principles as described above also applies for the virtual images 11, 13 and 14 projected in the side window 10. This results in a projection distance 15 of the third virtual image 14 which is the sum of: Distance 17 between ADAS LED Bar 1 and first mirror 4; distance 19 between first mirror 4 and second mirror 7 and distance 20 between second mirror 7 and side window 10.

Figure 10:
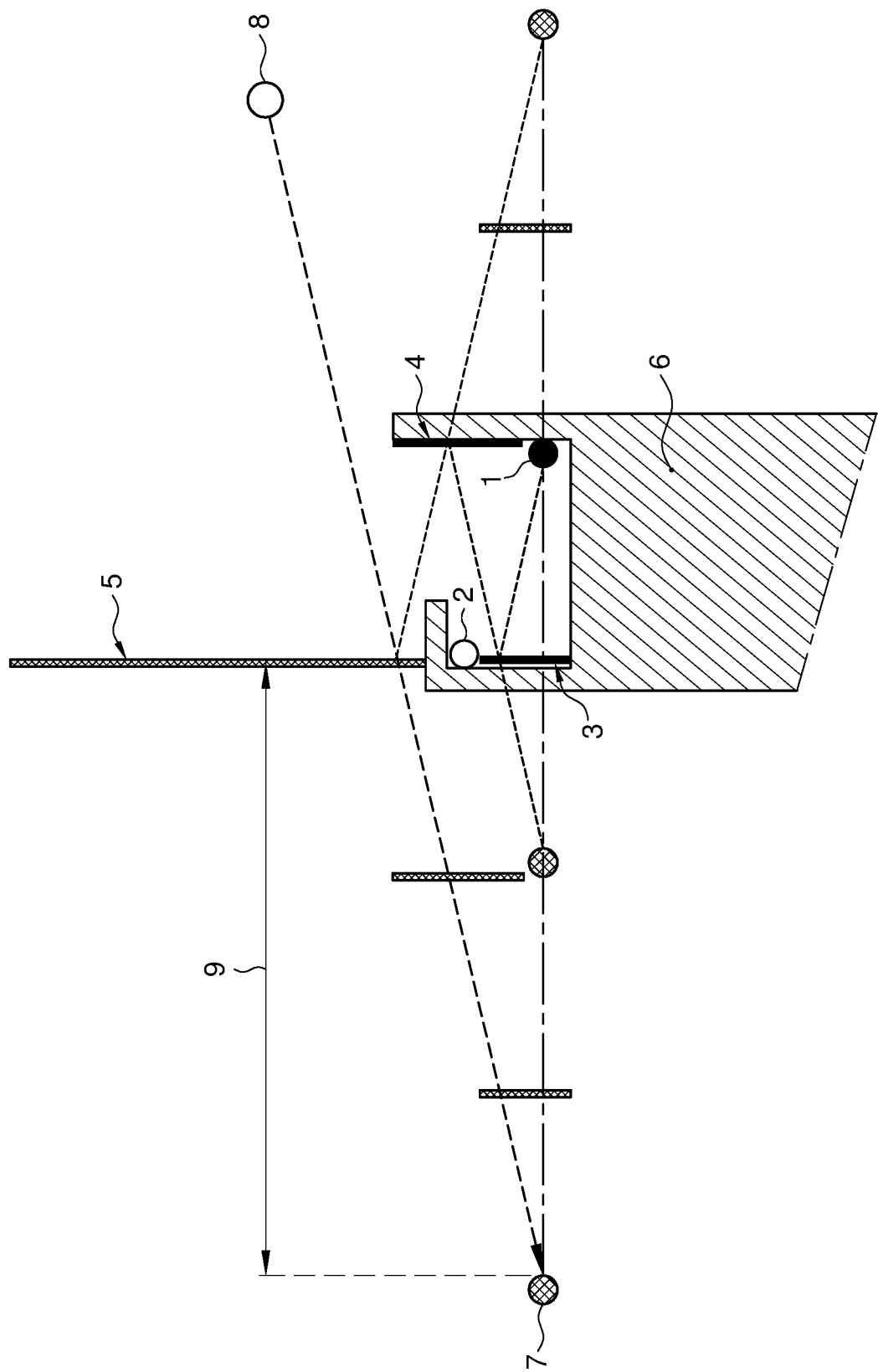
FIG. 10 shows a further embodiment of the system that enables multiple projections on the side window with different depths.

FIG. 10 shows a further example of the increased projection distance by an arrangement of additional mirrors and light sources in support 6. In particular, in the optical path between a light source 1 and the windshield 10, one or more further light sources 2 are provided wherein the control system is programmed to selectively activate one or more of said light sources 1 or 2 along said optical path, in function of a distance of the tracked object.

By this solution a projection distance of the virtual image can be further varied.

In FIG. 11A ECU system 800 is further illustrated. ECU system is comprised of a tracking controller 810 that is programmed to calculate, from a movement of a tracked object, a collision probability with the object, which can be expressed as a Time-To-Collision (TTC). A signal controller 820 is activated to display a signal light based on the calculated probability. A sensor receives raw data 1 and performs a clustering action 2 to render clustered data 3 that identifies relevant objects and characteristics. A warning level can be calculated, e.g. based on whether the object is a pedestrian, bike or automobile. This controller 810 has arithmetic means to calculate, based on the tracking controller output data, a specific activation of a light source in function of possible further tracking information data related to the tracking object. These tracking information data may correspond to the nature (human/not human), size, relative speed and likelihood of impact of the tracked objects. For example, the signal controller is programmed to activate a number of light sources along the contour in function of a distance of said tracked object. Different object types also have different sizes, e.g. a pedestrian is significantly smaller than a passenger car. This difference in object sizes are communicated to the driver by the size of the reflection of the active LED bar area. From the tracking controller, warning handler determines the behavioral aspects of the signal system based on a detected warning level. Behavioral aspects are for example LED color, light intensity, blinking frequency or motion, and a warning level 4 is communicated to the signal controller 820, that determines signal light behaviour 6 (e.g. colour, light intensity, blinking frequency). Object location 5 is communicated to an object representation handler; this sub function is responsible for determining which LED's should be activated based on information about the detected object (e.g. object location & type). In this way the representation handler determines activating of a number of light sources (location and range) of the plurality of light sources. A luminosity sensor 9 may indicate a background level, to adjust the brightness level of the light sources to environmental light conditions. The light sources are thus arranged to project a signal light indicative of the tracked object. Furthermore, the drivers viewing position is used to calculate the correct activation of the ADAS Bar LEDs so that it is viewed substantially centered along a virtual line of sight from the driver towards the identified object.

A LED control supervisor; based on the information this sub function receives from the other sub functions and issues an indication request describing all required LED properties and behavior to be signaled to the driver.

By way of example, a warning level may be signalled by increasing the light intensity of the light sources to indicate an increase in a risk of critical encounter. In another example, there is no need for attracting attention with the LEDs since this warning level can be combined with an acoustical warning realized by a Sound Manager. By way of further example, a further increased warning level may be signalled by a light intensity with a blinking character. For the functionality of controller 820, highlighting all objects is not the goal, and additional rules and strategies can be implemented to determine which objects are critical enough to be signaled. In addition, the signal controller can be programmed to activate a number of light sources along the contour in sequential order towards said virtual line of sight—to attract a drivers attention towards the relevant viewing direction.

FIG. 11B displays a sample diagram identifying a list of objects based on clustering raw laser-scanner data from a 2D or 3D laser scanner. Alternatively this raw data may also be coming from a radar or ultrasonic sensor or pixels deduced from camera images that are clustered together in order to identify objects. The measurement from the laser scanner is displayed as a set of points in the x,y-plane. To obtain a list of objects from the raw data, which is received as a set of discrete points, a clustering action is performed. In the clustering action, data-points are given a label that signifies they belong to the same object. For example, an algorithm determines which points belong to the same cluster by checking the Euclidian distance to all other data-points. Its parameters are a minimum number of points that should be close together, and the distance threshold that determines what is defined as close enough.

To represent each object in the LED bar, it is desired to know the location of its center, as well as the width, as is perceived by the driver with known location w.r.t. the laser-scanner. The center location of each cluster is determined by fitting a minimum volume enclosing ellipsoid around the set of points (approximated up to a certain tolerance).

An ellipse (e, f, g) with arbitrary orientation can represent a point-cloud with arbitrary length-width ratio with little over-fitting, resulting in a good approximation of the center location and width of the object (for the side the driver can see). When comparing to a rectangular bounding box, an ellipse is a more natural shape to use for calculation of the width, because it is less sensitive to the perspective used to look at the object.

The width the driver perceives is determined by calculating the outermost points on the ellipse e, f, g, which are visible from the driver's location. This can be illustrated by a corresponding view-cone as seen from the driver location (here at (−1,−0.8)) to the outermost points on the ellipse which are visible from this point. Centers of each cluster are indicated with a dot. Based on the object location, size, and other criteria, it is determined which objects should be visualized for the driver. A possible strategy to determine how to highlight the objects, is to compute the intersection of the view-cone of the different objects with the plane in which we want to visualize the reflection. This is done in the figure below for the two rightmost objects: With this strategy, the width of the high-light in the reflection is directly proportional to the perceived width of the object.

Further Embodiments

In an embodiment, the image data may be provided from cameras or as scan data from 2D or 3D scanners, formed by sets of reflection angles and corresponding reflection distances. The scan data, signifying a set of laser reflections (2D or 3D angle and reflection distance captured by e.g. lasers or radars) may be analyzed to identify an object to be tracked. Furthermore, optionally, the tracked object may be calculated or validated, e.g. by Kalman type filtering, from other sensors, e.g. in areas where the scanner cannot look. E.g. the reference position can be further measured by conventional means, e.g. on-board parking sensors. These additional sensors can also be used to optimize the driver interaction; e.g. by smoothen the accelerations or steering action according to preset constraints.

Figure 12:
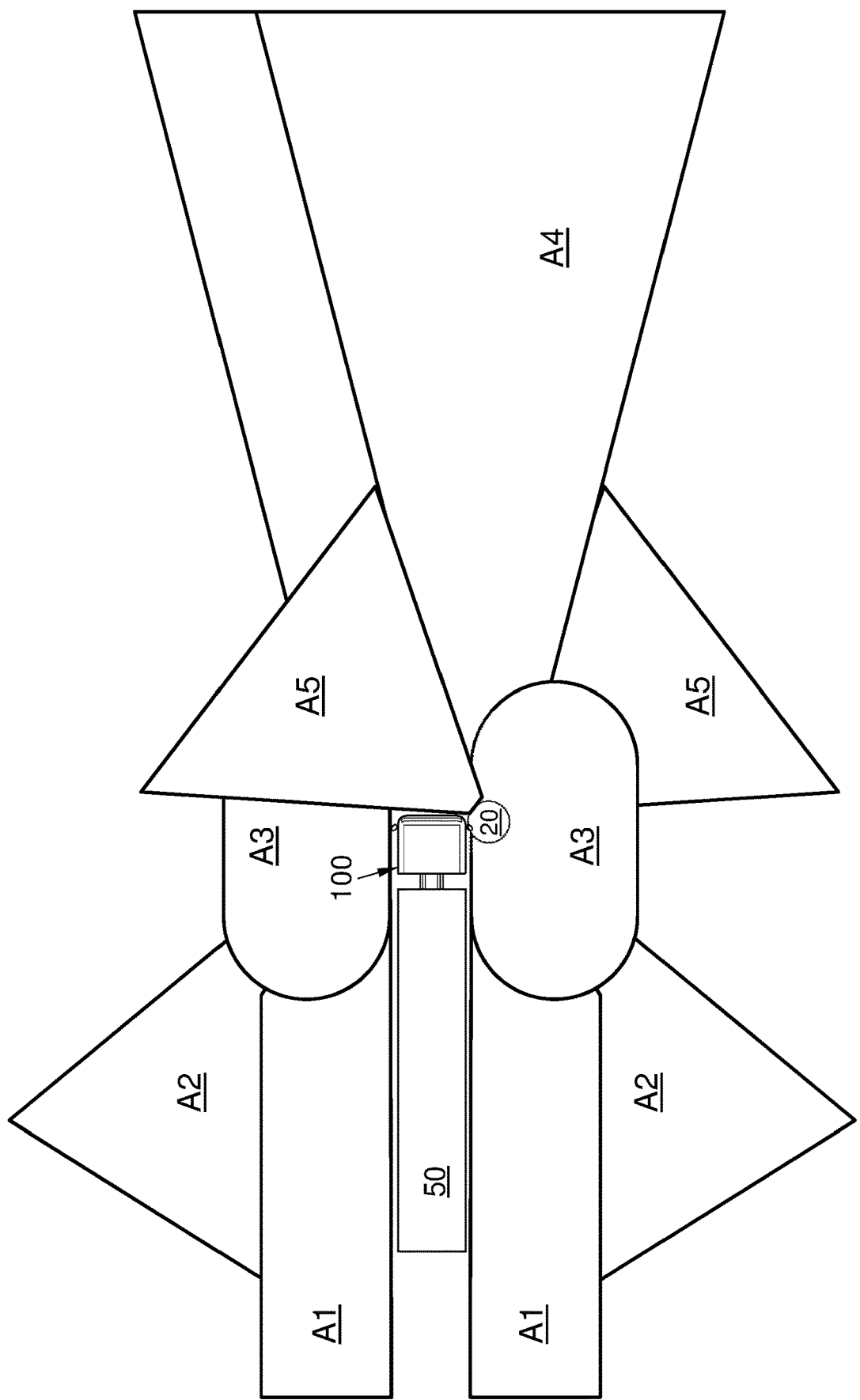
FIG. 12 shows an exemplary setup of a sensor system for the tracking controller consisting of two side units with a plurality of cameras scanning the complete perimeter of the vehicle

FIG. 12 shows a further exemplary embodiment wherein the signal system is provided with a plurality of cameras 20 scanning the perimeter of the vehicle. These cameras are typically clustered in side units at a location where normally the side mirrors are positioned. Said camera side unit may comprise a first camera imaging side area A1 extending rearward and alongside the vehicle; a second camera imaging a side area A2 extending sideways away from the vehicle; a third camera imaging a side proximity area A3 of the vehicle, typically being a blind spot detection camera in the form of so-called fish-eye camera lens to detect vulnerable road users like pedestrians and cyclists in the near side vicinity of the truck; a fourth forward looking camera scanning in longitudinal direction (in parallel and with a substantial offset to the vehicle axis) the front area A4 of the vehicle and a fifth camera imaging the near front area A5 of the vehicle in a substantial lateral slanted direction directed towards the opposing vehicle side where the other camera unit is located.

By having the above described cameras for respective image areas A1, A2, A3, A4 and A5 object tracking can be further enhanced by arbitration from images of these cameras possibly combined with signals coining from radar, lidars and/or ultrasonic sensors. Due to the fact that the vehicle is equipped with such camera systems at both sides of the vehicle a complete surround view that coverages of the vicinity of the vehicle is provided. The application of the signal system is not limited for signaling passengers or bikers that are withdrawn from direct visual sight. To the contrary, the signal system can be applied to signal a variety of objects and events of interest, that are detected in the vicinity of the truck. These can be in a non-imitative way barriers, posts, (still standing) vehicles etc. in particular, to function as a collision warning system, to prevent the vehicle from colliding during maneuvering.

The invention claimed is:

1. A signal system for alerting a truck driver in a driver cabin of a truck, the driver cabin having a curved windshield and side windows, said system comprising:
   a plurality of light sources arranged in array to project a signal light against the windshield and/or side windows, the array of light sources provided on an elongated support that is curved towards the windshield or the side windows along a horizontal contour of the windshield and side windows, outside a line of sight of the driver, and arranged to show a mirror image of the light sources in the windshield or the side windows along a horizontal lower contour of the curved windshield or side windows, visible to the driver;
   a tracking controller, coupled to at least one object sensor, arranged to sense and identify one or more objects to be tracked in the perimeter of the motor vehicle;
   a signal controller, coupled to the tracking controller for activating a number of light sources of the plurality of light sources, arranged to project a signal light indicative of said tracked object substantially centered along a virtual line of sight from the driver towards the identified object.

2. A system according to claim 1, wherein in an optical path between a light source and the windshield, one or more mirrors are provided, said mirrors increasing an optical path distance from the light source to the windshield.

3. A system according to claim 1, wherein in an optical path between a light source and the windshield, one or more further light sources are provided wherein the control system is programmed to selectively activate one or more of said light sources along said optical path, in function of a distance of the tracked object.

4. A system according to claim 1, wherein the signal system is programmed to activate said signal light indicative of said tracked object being visible to the driver.

5. A system according to claim 1, wherein the signal controller is programmed to activate a number of light sources along the contour in function of a distance of said tracked object.

6. A system according to claim 1, wherein the tracking controller is programmed to calculate, from a movement of a tracked object, a collision probability with the object, and to activate the signal controller to display a signal light based on the calculated probability.

7. A system according to claim 1, wherein the signal controller is programmed to activate a number of light sources along the contour in sequential order towards said virtual line of sight.

8. A system according to claim 1, wherein the signal controller further comprises a driver detection device, and the signal controller is programmed to adjust the virtual line of sight depending on a detected drivers position from the driver detection device.

9. A system according to claim 1, wherein the driver detection device registers the location of the drivers head or eyes relative to the signal light.

10. A system according to claim 1, wherein the signal controller further comprises a light sensor and is programmed to adjust the brightness level of the light sources to environmental light conditions, based on a sensor signal from the light sensor.

11. A system according to claim 1, further comprising a projection system that projects a tracked object on side posts of the cabin said projected object substantially centered along a virtual line of sight from the driver towards the identified object.

12. A system according to claim 11, wherein the side posts are covered with a reflective material, so that a mirror image of the light source is projected at a virtual distance behind the side post.

13. A method for alerting a driver of a driver cabin of a motor vehicle, said method comprising:
   providing, in the driver cabin, along a horizontal contour of windshield and side windows, outside a line of sight of the driver, a plurality of light sources arranged in array to project a signal light against the windshield and/or side window, to show a mirror image of the light source in the windshield or side window, visible to the driver;
   providing a tracking controller, coupled to at least one object sensor, arranged to identify one or more objects to be tracked in the perimeter of the motor vehicle;
   providing a signal controller, coupled to the tracking controller for activating a number of light sources of the plurality of light sources, arranged to project a signal light indicative of said tracked object substantially centered along a virtual line of sight from the driver towards the identified object.

14. A method according to claim 13, wherein the vehicle is equipped with camera systems at both sides of the vehicle providing a surround view that coverages of the vicinity of the vehicle.

* * * * *